United States Patent [19]

Quinn

[11] Patent Number: 5,322,872

[45] Date of Patent: Jun. 21, 1994

[54] STABILIZED COMPOSITIONS OF MIXED METAL CARBOXYLATES

[75] Inventor: Kevin J. Quinn, Stow, Ohio

[73] Assignee: The Lubrizol Corporation, Wickliffe, Ohio

[21] Appl. No.: 47,724

[22] Filed: Apr. 14, 1993

[51] Int. Cl.$^5$ ............................ C08K 5/16; C08K 5/09; C09K 15/32

[52] U.S. Cl. ................................ 524/186; 524/198; 524/236; 524/394; 524/399; 524/400; 252/400.1; 252/400.2; 252/400.52; 252/400.61; 252/401; 252/402; 252/403; 252/404; 252/405; 252/406; 252/407

[58] Field of Search ............. 252/400.1, 400.2, 400.21, 252/400.24, 400.52, 400.61, 401–407; 524/394, 399, 400, 186, 198, 236

[56] References Cited

U.S. PATENT DOCUMENTS

| | | | |
|---|---|---|---|
| 2,669,548 | 2/1951 | Darby et al. | 260/23 |
| 2,777,874 | 1/1957 | Asseff et al. | 260/504 |
| 3,390,111 | 6/1968 | Scullin et al. | 524/399 |
| 3,454,514 | 7/1969 | Baum | 252/400.52 |
| 3,682,853 | 8/1972 | Barie, Jr. et al. | 524/399 |
| 3,928,267 | 12/1975 | Rhodes et al. | 252/400.2 |
| 3,975,325 | 8/1976 | Long, Jr. | 524/399 |
| 4,123,399 | 10/1978 | Gay | 260/23 |
| 4,123,400 | 10/1978 | Gay | 260/23 |
| 4,178,282 | 12/1979 | Bae | 524/400 |
| 4,385,147 | 5/1983 | Wirth et al. | 524/399 |
| 4,401,779 | 8/1983 | Bae et al. | 524/399 |
| 4,661,544 | 4/1987 | Quinn | 524/399 |
| 4,751,118 | 6/1988 | Wypart et al. | 524/399 |
| 4,861,816 | 8/1989 | Kobayashi et al. | 524/400 |
| 4,963,594 | 10/1990 | Gay | 524/400 |
| 5,102,933 | 4/1992 | Bae et al. | 524/147 |
| 5,134,183 | 7/1992 | Pastor et al. | 524/186 |
| 5,147,917 | 9/1992 | Sugawara et al. | 524/400 |

FOREIGN PATENT DOCUMENTS 7639732 7/1978 France .

*Primary Examiner*—Paul R. Michl
*Assistant Examiner*—Tae H. Yoon
*Attorney, Agent, or Firm*—David M. Shold

[57] ABSTRACT

Compositions of (a) a salt of a metal and a carboxylic acid having at least 6 carbon atoms and (b) at least one salt of a metal other than the metal of (a) and a carboxylic acid having at least 6 carbon atoms in a fluid medium are stabilized towards storage decomposition and precipitation by incorporating in the composition (c) a complexing agent such as a ketoxime.

62 Claims, No Drawings

STABILIZED COMPOSITIONS OF MIXED METAL CARBOXYLATES

BACKGROUND OF THE INVENTION

The present invention relates to compositions of mixed metal salts which exhibits improved storage stability, and to the use of such compositions as a stabilizer for polymers.

Mixed metal salts of carboxylic acids are useful for many purposes. In particular mixed metal salt of carboxylic acids having at least 6 carbon atoms have been used as industrial soaps and greases in various applications, including use as stabilizers for polyvinyl chloride and other chlorine containing polymers. Often the salts are overbased, as described hereinafter, and often such salts are used in the form of a concentrate, e.g. with an amount of oil sufficient to provide a mobile, homogeneous, pourable, and handleable material.

While such mixed salts and compositions are very useful, problems are sometimes encountered. In particular the stability of certain combinations of metal salts to standing or storage can be inadequate due to fundamental incompatibility among the metal salts employed. Such incompatibility can be exhibited in oil formulations by development over time of turbidity, increased viscosity, or insoluble solids. As a result the composition is no longer an easily-handled, homogeneous, readily pourable liquid and must be specially treated in order to be used. Even in the absence of added oil certain mixed salts can exhibit deleterious interactions. The present invention provides a composition of mixed metal salts in which such problems are minimized or completely eliminated and which, accordingly, is superior for various uses including use as a polymer stabilizer.

Various references have reported the use of carboxylate salts as polymer stabilizers, and various problems encountered therein. French publication 2,376,178, Jul. 28, 1978 discloses chemical stabilizers that protect halogenated vinyl polymers from rapid decomposition due to exposure to heat, comprising a tin complex or a complex of antimony, a hydrochloric acid acceptor, an organic chelating agent, and a lubricant. The hydrochloric acid acceptor is a salt of an alkali or alkaline earth metal or Zn, Cd, or Pb oxides, which can be cleaved by HCl. It is also possible to use superbasic salts. The organic chelating agent captures the metal chlorides produced during thermal degradation and forms stable and inoffensive complexes. Suitable agents include oxycarboxylic acids, polyols, polyamines, and organic phosphites.

U.S. Pat. No. 2,669,549, Darby et al., February 1954, discloses PVC stabilized with zinc stearate and calcium ethyl acetoacetate. The PVC is resistant to discoloration.

U.S. Pat. Nos. 4,123,399 and -400, Gay, Oct. 31, 1978, disclose a PVC formulation containing a mixed organometallic salt, a polyol, and a β-diketone. The organometallic salt is e.g. calcium stearate plus zinc stearate. Other combinations include calcium or barium salts used conjointly with cadmium or zinc salts.

U.S. Pat. No. 5,102,933. Bae et al., Apr. 7, 1992, filed May 22, 1990, discloses a composition which is useful as a thermal stabilizer for PVC, comprising a substituted β-diketone, mannitol, and a mixture of magnesium and zinc salts of benzoic and fatty aliphatic acids, preferably having at least 10 carbon atoms.

SUMMARY OF THE INVENTION

The present invention provides a stabilized composition comprising, in an organic fluid medium (a) a salt of a metal and a carboxylic acid having at least 6 carbon atoms; (b) at least one salt of a metal other than the metal of (a) and a carboxylic acid having at least 6 carbon atoms; and (c) a complexing agent selected from the group consisting of phosphines, phosphites, aromatic cyanides, polynitrogen containing aromatic compounds, aromatic hydroxy compounds, aromatic amines, trifluoroacetates, dimethylsulfoxide, dithiocarbamates, dithiophosphinates, sulfursubstituted thiocyanates, nitrogen-substituted thiocyanates, thiadiazoles, and oximes.

The invention further provides a process for providing shelf-stability to a mixture, in an organic fluid medium, of (a) a salt of a metal and a carboxylic acid having at least 6 carbon atoms and (b) at least one salt of a metal other than the metal of (a) and a carboxylic acid having at least 6 carbon atoms, comprising including in the mixture a complexing agent as above.

The invention further provides a polymeric composition comprising a chlorine-containing polymer and such a stabilized composition.

DETAILED DESCRIPTION OF THE INVENTION

The first important component of the composition of the present invention is a salt of a metal and a carboxylic acid having at least 6 carbon atoms. Carboxylic acids are acids having a formula RCOOH where R is a functional group. Carboxylic acids having at least 6 carbon atoms include alkanoic acids such as hexanoic acid, but also include other acids where R is other than an alkyl group. The carboxylic acids useful in the present invention may be aliphatic or aromatic, mono- or polycarboxylic acids. These carboxylic acids include lower molecular weight carboxylic acids (e.g., carboxylic acids having 6 to 22 carbon atoms such as tetrapropenyl-substituted succinic acid) as well as higher molecular weight carboxylic acids.

The carboxylic acids of this invention are preferably oil-soluble, particularly if the acid is to be overbased, as described below. Usually, in order to provide the desired oil-solubility, the number of carbon atoms in the carboxylic acid should be at least 8, more preferably at least 18, and sometimes as large as 30 or even 50 or more. Generally, these carboxylic acids do not contain more than 400 carbon atoms per molecule.

The lower molecular weight monocarboxylic acids contemplated for use in this invention include saturated and unsaturated acids. Examples of such useful acids include dodecanoic acid, decanoic acid, oleic acid, stearic acid, linoleic acid, tall oil acid, etc. Mixtures of two or more such agents can also be used. An extensive discussion of these acids is found in Kirk-Othmer "Encyclopedia of Chemical Technology" Third Edition, 1978, John Wiley & Sons New York, pp. 814–871.

The monocarboxylic acids include isoaliphatic acids. Such acids can contain a principal chain having from 14 to 20 saturated, aliphatic carbon atoms and at least one but usually no more than four pendant acyclic lower alkyl groups. Specific examples of such isoaliphatic acids include 10-methyl-tetradecanoic acid, 3-ethyl-hexadecanoic acid, and 8-methyl-octadecanoic acid.

The isoaliphatic acids include mixtures of branch-chain acids prepared by the isomerization of commercial fatty acids (oleic, linoleic or tall oil acids) of, for example, 16 to 20 carbon atoms.

High molecular weight carboxylic acids may also be used in the present invention. These acids have a substituent group derived from a polyalkene. The polyalkene is characterized as containing at least 30 carbon atoms, preferably at least 35, more preferably at least 50, and up to 300 carbon atoms, preferably 200, more preferably 150. In one embodiment, the polyalkene is characterized by an Mn (number average molecular weight) value of at least 500, generally 500 to 5000, preferably 800 to 2500. In another embodiment, Mn varies between 500 to 1200 or 1300.

The polyalkenes include homopolymers and interpolymers of polymerizable olefin monomers of 2 to 16 carbon atoms. The olefins may be monoolefins such as ethylene, propylene, 1-butene, isobutene, and 1-octene; or a polyolefinic monomer, preferably diolefinic, monomer such 1,3-butadiene and isoprene. Preferably the monomers contain from 2 to 6 carbon atoms, more preferably 2 to 4, more preferably 4. The interpolymers include copolymers, terpolymers, tetrapolymers and the like. Preferably, the interpolymer is a homopolymer. An example of a preferred homopolymer is a polybutene, preferably a polybutene in which about 50% of the polymer is derived from isobutylene. The polyalkenes are prepared by conventional procedures.

Illustrative carboxylic acids include palmitic acid, stearic acid, myristic acid, oleic acid, linoleic acid, behenic acid, hexatriacontanoic acid, tetrapropylenylsubstituted glutaric acid, polybutenyl-substituted succinic acid derived from a polybutene (Mn=200-1500, preferably 300-1000), polypropenyl-substituted succinic acid derived from a polypropene, (Mn=200-1000, preferably 300-900), octadecyl-substituted adipic acid, chlorostearic acid, 9-methylstearic acid, dichlorostearic acid, stearyl-benzoic acid, eicosanyl-substituted naphthoic acid, dilauryl-decahydronaphthalene carboxylic acid, mixtures of any of these acids.

In another embodiment, the carboxylic acid is an alkylalkyleneglycol-acetic acid, more preferably alkylpolyethyleneglycol-acetic acid. Some specific examples of these compounds include: iso-stearylpentaethyleneglycolacetic acid; iso-stearyl—O—(CH₂CH₂O)₅CH₂CO₂Na; lauryl—O—(CH₂CH₂O)₂.₅—CH₂CO₂H; lauryl—O—(CH₂CH₂O)₃.₃CH₂CO₂H; oleyl—O—(CH₂C—H₂O)₄—CH₂CO₂H; lauryl—O—(CH₂CH₂O)₄.₅CH₂CO₂H; lauryl—O—CH₂CH₂O)₁₀CH₂CO₂H; lauryl—O—(CH₂CH₂O)₁₆CH₂CO₂H; octylphenyl—O—(CH₂CH₂O)₈CH₂CO₂H; octyl-pheny—O—(CH₂CH₂O)₁₉CH₂CO₂H; 2-octyl-decanyl—O—(CH₂CH₂O)₆CH₂CO₂H. These acids are available commercially from Sandoz Chemical under the tradename Sandopan TM acids.

In another embodiment, the carboxylic acids are aromatic carboxylic acids. A group of useful aromatic carboxylic acids are those of the formula

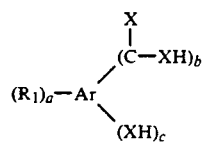

wherein R₁ is an aliphatic hydrocarbyl group of preferably 4 to 400 carbon atoms, a is a number in the range of zero to 4, usually 1 or 2, Ar is an aromatic group, each X is independently sulfur or oxygen, preferably oxygen, b is a number in the range of from 1 to 4, usually 1 or 2, c is a number in the range of zero to 4, usually 1 to 2, with the proviso that the sum of a, b and c does not exceed the number of valences of Ar. Preferably, R₁ and a are such that there is an average of at least 8 aliphatic carbon atoms provided by the R₁ groups. Examples of aromatic carboxylic acids include substituted and non-substituted benzoic, phthalic and salicylic acids or anhydrides.

The R₁ group is a hydrocarbyl group that is directly bonded to the aromatic group Ar. R₁ preferably contains 6 to 80 carbon atoms, preferably 6 to 30 carbon atoms, more preferably 8 to 25 carbon atoms, and advantageously 8 to 15 carbon atoms. R₁ groups may be derived form one or more of the above-described polyalkenes. Examples of R₁ groups include butyl, isobutyl, pentyl, octyl, nonyl, dodecyl, 5-chlorohexyl, 4-ethoxypentyl, 3-cyclohexyloctyl, 2,3,5-trimethylheptyl, and substituents derived from polymerized olefins such as polyethylenes, polypropylenes, polyisobutylenes, ethylene-propylene copolymers, chlorinated olefin polymers, oxidized ethylene-propylene copolymers, propylene tetramer and tri(isobutene).

The aromatic group Ar may have the same structure as any of the aromatic groups Ar discussed below. Examples of the aromatic groups that are useful herein include the polyvalent aromatic groups derived from benzene, naphthalene, anthracene, etc., preferably benzene. Specific examples of Ar groups include phenylenes and naphthalene, e.g., methylphenylenes, ethoxyphenylenes, isopropylphenylenes, hydroxyphenylenes, dipropoxynaphthalenes, etc.

Within this group of aromatic acids, a useful class of carboxylic acids are those of the formula

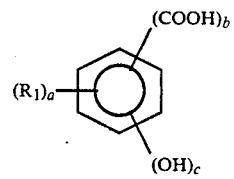

wherein R₁ is defined above, a is a number in the range of from zero to 4, preferably 1 to 2; b is a number in the range of 1 to 4, preferably 1 to 2, c is a number in the range of zero to 4, preferably 1 to 2, and more preferably 1; with the proviso that the sum of a, b and c does not exceed 6. Preferably, R₁ and a are such that the acid molecules contain at least an average of 12 aliphatic carbon atoms in the aliphatic hydrocarbon substituents per acid molecule. Preferably, b and c are each one and the carboxylic acid is a salicylic acid.

The above aromatic carboxylic acids are well known or can be prepared according to procedures known in the art.

For the first component of the composition of the present invention, it is preferred that the carboxylic acid contain at least 8 carbon atoms, and more preferably 14 to 22 carbon atoms. The most preferred carboxylic acids are alkanoic or alkenoic acids containing about 18 carbon atoms, and in particular oleic acid.

The second component of the present invention is likewise at least one salt of a carboxylic acid having at least 6 carbon atoms; however in this case the salt is that of a metal other than the metal of the first salt. The carboxylic acid of the second component can be generally described as for the first component, above. It is preferred, however, that the second carboxylic acid be an alkanoic or alkenoic acid having 8 to 18 carbon atoms, and most preferably octanoic acid or an isomer of octanoic acid.

The first and second component differ principally in that the metal or metals of component (b) differ from the metal of component (a). It is preferred that at least one of the metals of (a) or (b) is an alkaline earth metal, that is, beryllium, magnesium, calcium, strontium, or barium, radium being uncommon and not generally employed. Other metals which are preferred for use in the present invention include the transition metals, in particular those in column IIb (C.A.S. numbering), preferably zinc and cadmium. Preferred combinations are those in which one of the metals is calcium or barium and another metal is barium, cadmium, or zinc. For mixtures in which two metals are present, such preferred combinations include calcium and barium, calcium and cadmium, calcium and zinc, barium and cadmium, and barium and zinc. If three or more metals are present, preferred combinations include barium, zinc, and cadmium, and barium, zinc, and calcium. These combinations are considered preferred because such combinations often exhibit deleterious interactions such that the improvement obtained by employing the present invention is most apparent. The advantage of the present invention is particularly apparent when a combination of salts such as calcium oleate and zinc octoate is employed.

The present invention is advantageously employed with any combination of salts and in any concentrations which exhibit problems of storage stability as described above. When calcium or barium are used as a metal for the first salt, the invention is particularly useful when the weight ratio of the calcium or barium to the other metal or metals is 0.1:1 to 15:1. Preferably the weight ratio is 0.5:1 to 4:1.

It is also permitted that the salts of components (a) or (b) be overbased materials, as compositions containing such materials are sometimes even more sensitive to storage instability. Overbased materials, otherwise referred to as overbased or superbased salts, are generally single phase, homogeneous Newtonian systems characterized by a metal content in excess of that which would be present for neutralization according to the stoichiometry of the metal and the particular acidic organic compound reacted with the metal. The overbased materials are prepared by reacting an acidic material (typically an inorganic acid or lower carboxylic acid, preferably an acid gas such as carbon dioxide, sulfur dioxide, or sulfur trioxide, and most preferably carbon dioxide) with a mixture comprising an acidic organic compound (in this case a carboxylic acid), a reaction medium comprising at least one inert, organic solvent (mineral oil, naphtha, toluene, xylene, etc.) for said acidic organic material, a stoichiometric excess of a metal base, and a promoter. A promoter is a chemical employed to facilitate the incorporation of metal into the basic metal compositions. Among the chemicals useful as promoters are water, ammonium hydroxide, organic acids of up to about 8 carbon atoms, nitric acid, sulfuric acid, hydrochloric acid, and alkali metal hydroxides such as lithium hydroxide, sodium hydroxide and potassium hydroxide, and mono- and polyhydric alcohols of up to about 30 carbon atoms. Examples of the alcohols include methanol, ethanol, isopropanol, dodecanol, behenyl alcohol, ethylene glycol, monomethyl ether of ethylene glycol, hexamethylene glycol, glycerol, pentaerythritol, benzyl alcohol, phenylethyl alcohol, aminoethanol, cinnamyl alcohol, allyl alcohol, and the like. Especially useful are the monohydric alcohols having up to about 10 carbon atoms and mixtures of methanol with higher monohydric alcohols.

In order to be readily overbased the carboxylic acid being so treated will normally have a sufficient number of carbon atoms to provide a degree of solubility in oil. The amount of excess metal is commonly expressed in terms of metal ratio. The term "metal ratio" is the ratio of the total equivalents of the metal to the equivalents of the acidic organic compound. A neutral metal salt has a metal ratio of one. A salt having 4.5 times as much metal as present in a normal salt will have metal excess of 3.5 equivalents, or a ratio of 4.5. It is preferred for the present invention, if the salt is to be overbased, that it have a metal ratio of 2 to 8.

Such overbased materials are well known to those skilled in the art. Patents describing techniques for making basic salts of carboxylic acids and other acidic materials include U.S. Pat. Nos. 2,501,731; 2,616,905; 2,616,911; 2,616,925; 2,777,874; 3,256,186; 3,384,585; 3,365,396; 3,320,162; 3,318,809; 3,488,284; and 3,629,109.

In order to prevent the precipitation, coagulation, or other storage instability of compositions of mixed metal carboxylates, an effective amount of a complexing agent is added. The mechanism of reaction of the complexing agent in the present invention is not fully understood, but it believed that the complexing agent will form a soluble complex with one or more of the metals and thereby prevent formation of insoluble salts of the metal with one of the carboxylic acids. That is, metal A may form a soluble salt with acid B and metal X may form a soluble salt with acid Y, but salts AY or XB may not be soluble. It is believed that the complexing agent prevents formation of such insoluble salts, but the scope of the invention is not intended to be limited by any such explanation. The use of any complexing agent in any amount which prevents the deleterious phenomena outlined above is intended to be encompassed by the present invention.

Suitable complexing agents include phosphines such as triphenylphosphine or triethylphosphine; phosphites such as triphenylphosphite or diphenyldecylphosphite; aromatic cyanides such as phenyl cyanide, o-methylphenyl cyanide, and dicyanobenzene; unsubstituted purines and other polynitrogen containing aromatic compounds including pyradazine, pyrimidine, purine, pyrazine, 1,8-naphthyridine, and aromatic triazoles such as benzotriazole and tolyltriazole; aromatic hydroxy compounds such as phenols, alkylphenols, alkylaminophenols, and methylene coupled alkylphenols; aromatic amines such as alkylated diphenyl amines; trifluoroacetates; dimethylsulfoxide; dithiocarbamates; dithiophosphinates; sulfur-substituted thiocyanates such as phenylthiocyanate and octylthiocyanate; nitrogen-substituted thiocyanates; thiadiazoles such as dimercaptothiadiazole-mercaptan cross-coupled disulfides and alkylphenolformaldehyde-dimercaptothiadiazole products; and oximes.

The preferred class of complexing agent is the oximes. Oximes are materials which have the general chemical formula

where R and R' are independently hydrogen or hydrocarbyl groups (not more than one of R and R' being hydrogen); also included are alkyl glyoximes, having a structure

and other equivalent materials. Oximes can be prepared by the addition of hydroxylamine to aldehydes or ketones, with the subsequent loss of water. The reactions of aldehydes and ketones with hydroxylamine can be catalyzed by acid; they take place most readily at a hydrogen concentration such that the reagent is half converted into its salt. When the reagent is an aldehyde, the product is an aldoxime; for example, acetaldehyde yields acetaldoxime, where R is $-CH_3$ and R' is $-H$. When the reagent is a ketone, the product is a ketoxime; for example, methyl ethyl ketone yields methyl ethyl ketoxime, where R is $-CH_3$ and R' is $-C_2H_5$.

The identity of the R and R' groups on the oxime are not critical, but the oxime should have sufficient solubility in the medium employed that it can function as a complexing agent. Thus if the medium is oil it is preferred that at least one of the groups be a hydrocarbyl group of sufficient length to impart a measure of oil solubility. Methyl ethyl ketoxime is normally sufficient for this purpose, but for different media adjustments may need to be made in the R and R' groups, which will be apparent to one skilled in the art. At the other extreme, the groups R and R' should not be so long that the material becomes difficult to handle (e.g. an insoluble or high melting solid) or that the oxime becomes so oleophilic that it is unable to effective complex the metal ions of the mixture. For most purposes it is preferred that R and R' are alkyl group having 1 to 6 carbon atoms, and preferably the total number of carbon atoms in R plus R' being up to 7. However, R can also be an aryl or an alkaryl group, e.g. aryl ketoximes such as the oxime of benzaldehyde. Suitable oximes include acetaldoxime, propionaldoxime, butyraldoxime, pentanaldoxime, hexanaldoxime, acetoxime (dimethyl ketoxime), methyl ethyl ketoxime, methyl propyl ketoxime, methyl butyl ketoxime, methyl pentyl ketoxime, diethyl ketoxime, ethyl propyl ketoxime, ethyl butyl ketoxime, ethyl pentyl ketoxime, dipropyl ketoxime, propyl butyl ketoxime, and dimethyl glyoxime, where the named alkyl groups can be normal or branched. Many oximes, such as methyl ethyl ketoxime (which is especially preferred) are commercially available.

The composition of the present invention is normally used in an organic fluid medium. Indeed, one of the major advantages of the present invention is that it permits mutually incompatible salts to remain dissolved or dispersed in an organic fluid medium, without storage instability evidenced by e.g. precipitation. The organic fluid medium can be any medium in which the salts are individually soluble and which is compatible with the ultimate end use designed for the composition. The medium can be, for example, an oil or an organic solvent.

Oils include oils of lubricating viscosity. Such oils include natural or synthetic lubricating oils and mixtures thereof. Natural oils include animal oils, vegetable oils, mineral lubricating oils of paraffinic, naphthenic, or mixed types, solvent or acid treated mineral oils, and oils derived from coal or shale. Synthetic lubricating oils include hydrocarbon oils, halo-substituted hydrocarbon oils, alkylene oxide polymers (including those made by polymerization of ethylene oxide or propylene oxide), esters of dicarboxylic acids and a variety of alcohols including polyols, esters of monocarboxylic acids and polyols, esters of phosphorus-containing acids, polymeric tetrahydrofurans, and silicon-based oils (including siloxane oils and silicate oils). Included are unrefined, refined, and rerefined oils. Specific examples of the oils of lubricating viscosity are described in U.S. Pat. No. 4,326,972. Other types of oils include fuel oils, preservative oils, and quench oils.

The fluid medium can also be an organic solvent. A wide diversity of organic solvents are known; those which are preferred are substantially non-polar or oleophilic solvents, since it is in such materials that the instability of the present mixed salts is most apparent and, accordingly, in which the present invention is most useful. Preferred solvents include those based on aromatic or aliphatic hydrocarbons. Aromatic solvents include benzene, toluene, xylenes, and aromatic fractions from distillation of petroleum. Aliphatic hydrocarbon solvents include hexane, cyclohexane, heptanes, octanes, and similar straight and branched hydrocarbons and mixtures thereof, generally having 4-12 carbon atoms. Also included are aliphatic fractions from distillation of petroleum including mineral spirits and kerosene. Other solvents include comparable materials from other natural or synthetic sources, such as turpentine.

The relative amounts of the materials of the present invention are those amounts and proportions which exhibit the advantage of improved storage stability, when compared to compositions in which the complexing agent is absent. In many cases it is desirable that the amount of liquid organic medium comprises 8 to 70, preferably 15 to 40, and more preferably 18 to 30 weight percent of the composition. The total of the two or more salts of carboxylic acids will normally comprise 25 to 90, preferably 55 to 84, and more preferably 68 to 80 weight percent of the composition. The complexing agent will normally comprise 0.01 to 10, preferably 0.1 to 5, and more preferably 1 to 3 percent by weight of the composition. It is frequently desirable that the amount of the complexing agent be 0.5 to 3 percent based on the weight of the two or more carboxylate salts.

The compositions of the present invention can be prepared by mixing together the components by ordinary means. The mixing of the components can be simultaneous or serial and can be conducted in any order, but it is sometimes helpful to first add methyl ethyl ketoxime to the calcium or barium overbased salt, mixing, and then adding the other (e.g. Zn) salt. It has even been observed that methyl ethyl ketoxime can be mixed into a mixture of salts in an oil medium after the salts have begun to precipitate or coagulate, thereby reversing the precipitation process and providing a free-flowing fluid. Heating is not generally required or desired.

The compositions of the present invention can also contain further additives or components which are commonly used in such applications. For example, any of the following materials can be present in modest or customary amounts: surfactants, dispersants, salts such as sulfonates, phosphonates, or phenates, stabilizers such as βdiketones and epoxidized oils including epoxidized soya oil, phosphite esters such as alkyl/aryl phosphites and triarylphosphites, in particular triphenylphosphite, viscosity index modifiers, extreme pressure agents, detergents, antioxidants, anti-corrosion agents, optical brighteners, and fillers.

The compositions of the present invention find their principal utility as additives for polymers, in particular for halogen-containing polymers. Addition of such compositions, especially those with overbased metal salts, are believed to serve to scavenge acidic products of decomposition, such as HCl generated from decomposition of polyvinyl chloride. Accordingly, the compositions of the present invention are particularly useful as additives to such polymers as polyvinyl chloride, vinyl chloride copolymers, polyvinylidene chloride, and polyvinylidene chloride copolymers, where the comonomers can include such substances as ethylene, propylene, dienes such as butadiene, vinyl chloride, vinylidene chloride, vinyl bromide, vinylidene bromide, fluorine-containing monomers, vinyl acetate, ethyl acrylate, ethyl methacrylate, carbon monoxide, and acrylonitrile.

As used herein, the term "hydrocarbyl substituent" or "hydrocarbyl group" means a group having a carbon atom directly attached to the remainder of the molecule and having predominantly hydrocarbon character. Such groups include hydrocarbon groups, substituted hydrocarbon groups, and hetero groups, that is, groups which, while primarily hydrocarbon in character, contain atoms other than carbon present in a chain or ring otherwise composed of carbon atoms.

EXAMPLES

EXAMPLE 1

Calcium carbonate overbased oleic acid is prepared. To a mixture of 903 parts by weight diluent oil (mineral oil), 483 parts of an isobutanol/primary amyl alcohol mixture, 191 parts hydrated lime, and 153 parts polyisobutylene substituted succinic anhydride dispersant (an optional ingredient), under a nitrogen purge, is added 1000 parts oleic acid, with stirring. The temperature is allowed to rise to 82°–87° C. The mixture is stirred at temperature for one hour. After cooling to 40°–46° C., 119 parts methanol are added. Additional lime is added in three portions of 242 parts each while the nitrogen purge is replaced by a subsurface carbon dioxide flow (approximately 442 parts) at 40°–46° C. After the addition of lime and carbon dioxide is complete, the material is dried at 150° C. under nitrogen purge, cooled to 66° C., combined with system flushes, and clarified. Thereafter the material is flash stripped at 150° C. at a pressure of 9.3 kPa (70 mm Hg absolute). After filtration and cooling, a small amount of additional diluent oil is added (about 175 parts). The product is the desired overbased material, being about 14% by weight Ca overall and having a TBN of 400. (TBN is total base number, which is defined as (56,100 mg KOH)×equivalents of titratable metal/gram of sample, expressed in units of mg KOH/g sample.)

EXAMPLE 2.

Eighty-five point four parts by weight of the overbased material from Example 1 is mixed with one part methyl ethyl ketoxime. To this mixture is added, with stirring 13.6 parts zinc octoate (22% Zn by weight, from the commercial material "22% Zn Hex-Cem ™," believed to contain a small amount of zinc hydroxide/octanoate). The resulting mixture is a clear amber liquid exhibiting excellent package (storage) stability.

EXAMPLE 3 (comparative).

Example 2 is repeated except that the methyl ethyl ketoxime is omitted. The mixture becomes a turbid amber solid upon standing at room temperature for 1 day.

EXAMPLES 4–7

The following compositions are prepared:

| Ex. | Ca mixture of Ex. 1 (wt. %) | Zn octoate (wt. %) | Wt. ratio Ca/Zn | Methyl Ethyl Ketoxime (wt. %) |
|---|---|---|---|---|
| 4 | 43.6 | 55.4 | 0.5 | 1 |
| 5 | 60.5 | 38.5 | 1.0 | 1 |
| 6 | 75.1 | 23.9 | 2.0 | 1 |
| 7 | 85.4 | 13.6 | 4.0 | 1 |

The compositions show good storage stability.

EXAMPLES 8–18

The following compositions are prepared:

| | Salt 1 | | Salt 2 | | Complexing agent | |
|---|---|---|---|---|---|---|
| Ex. | Type. | % | Type. | % | Type. | % |
| 8 | Ca (Ex 1) | 96.8 | Zn octanoate | 3.1 | MEKO$^a$ | 0.1 |
| 9 | Ca (Ex 1) | 75.1 | Zn octanoate | 23.9 | MEKO | 3.0 |
| 10 | Ca (Ex 1) | 21.6 | Zn octoate$^b$ | 68.3 | MEKO | 10.0 |
| 11 | Ca (Ex 1) | 75.1 | Zn octanoate | 23.9 | acetaldoxime | 0.5 |
| 12 | Ca (Ex 1) | 75.1 | Zn octanoate | 23.9 | ethyl propyl ketoxime | 2.0 |
| 13 | Ca (Ex 1) | 75.1 | Zn octanoate | 23.9 | benzaldoxime | 1.0 |
| 14 | Ca (Ex 1) | 62 | Ba decanoate | 36 | MEKO | 2.0 |
| 15 | Ca (Ex 1) | 68 | Cd octanoate | 30 | MEKO | 2.0 |
| 16 | Ba$^c$ | 84 | Zn octanoate | 15 | MEKO | 1.0 |
| 17 | Ba$^c$ | 80 | Zn stearate | 19 | MEKO | 1.0 |
| 18 | Ca$^d$ | 75 | Zn octanoate | 24 | MEKO | 2.0 |

$^a$MEKO = methyl ethyl ketoxime.
$^b$Zinc octanoate, containing about 18% zinc by weight.
$^c$Carbonate overbased barium fatty acid mixture of $C_{12}$–$C_{20}$ carboxylates, containing 31 wt. % barium and 35 wt. % diluent oil, prepared by analogy with Example 1.
$^d$Calcium overbased material as in Example 1, except that in place of mineral oil, the diluent is mineral spirits. In the preparation of this material, isopropanol replaces the isobutanol/primary amyl alcohol mixture of Example 1; after addition of $CO_2$ is complete, the material is dried by azeotropically removing the alcohol/water mixture with the aid of a nitrogen purge.

a. MEKO=methyl ethyl ketoxime. b. Zinc octanoate, containing about 18% zinc by weight. c. Carbonate overbased barium fatty acid mixture of $C_{12}$-$C_{20}$ carboxylates, containing 31 wt. % barium and 35 wt. % diluent oil, prepared by analogy with Example 1. d. Calcium overbased material as in Example 1, except that in place of mineral oil, the diluent is mineral spirits. In the preparation of this material, isopropanol replaces the isobutanol/primary amyl alcohol mixture of Example 1; after addition of $CO_2$ is complete, the material is dried by azeotropically removing the alcohol/water mixture with the aid of a nitrogen purge.

EXAMPLE 19

A composition is prepared comprising 60 parts by weight of the calcium overbased material of Example 1, 19 parts by weight of the zinc stearate of Example 17, 20 parts by weight of barium decanoate, and 1 part by weight of methyl ethyl ketoxime.

EXAMPLE 20

A composition is prepared by melt blending 96 parts by weight of a commercial grade of polyvinyl chloride resin (containing the customary plasticizers) with 4 parts by weight of the composition of Example 2.

Each of the documents referred to above is incorporated herein by reference. Except in the Examples, or where otherwise explicitly indicated, all numerical quantities in this description specifying amounts of materials or reaction conditions are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil which may be customarily present in the commercial material, unless otherwise indicated. As used herein, the expression "consisting essentially of" permits the inclusion of substances which do not materially affect the basic and novel characteristics of the composition under consideration.

What is claimed is:

1. A stabilized composition comprising, in an organic fluid medium:
   (a) a salt of a metal and a carboxylic acid having at least 6 carbon atoms;
   (b) at least one salt of a metal other than the metal of (a) and a carboxylic acid having at least 6 carbon atoms; and
   (c) an oxime complexing agent.

2. The composition of claim 1 wherein the complexing agent is an aldoxime or a ketoxime.

3. The composition of claim 1 wherein the oxime is a dialkyl ketoxime.

4. The composition of claim 3 wherein the ketoxime is methyl ethyl ketoxime.

5. The composition of claim 1 wherein the complexing agent comprises about 0.01 to about 10% by weight of the composition.

6. The composition of claim 1 wherein the complexing agent comprises about 1 to about 3% by weight of the composition.

7. The composition of claim 1 wherein one of the metals is an alkaline earth metal.

8. The composition of claim 7 wherein one of the metals is calcium or barium.

9. The composition of claim 8 wherein the other metal is barium, cadmium, or zinc.

10. The composition of claim 1 wherein two or three metals are present.

11. The composition of claim 1 wherein at least three metals are present and the metals comprise barium, zinc, and cadmium or barium, zinc, and calcium.

12. The composition of claim 1 wherein component (a) comprises a metal salt of a carboxylic acid having at least about 8 carbon atoms.

13. The composition of claim 12 wherein component (a) comprises a metal salt of a carboxylic acid having about 14 to about 22 carbon atoms.

14. The composition of claim 13 wherein the carboxylic acid of (a) has about 16 to about 20 carbon atoms.

15. The composition of claim 14 wherein the carboxylic acid of (a) is oleic acid.

16. The composition of claim 1 wherein component (b) comprises a metal salt of a carboxylic acid having at least about 8 carbon atoms.

17. The composition of claim 16 wherein component (b) comprises a metal salt of a carboxylic acid having about 8 to about 18 carbon atoms.

18. The composition of claim 17 wherein the carboxylic acid of (b) is octanoic acid.

19. The composition of claim 1 wherein (a) is calcium oleate and (b) is zinc octoate.

20. The composition of claim 1 wherein at least one of the salts is an overbased salt.

21. The composition of claim 20 wherein the overbased salt is a carbonated material.

22. The composition of claim 21 wherein the metal ratio of the overbased salt is about 2 to about 8.

23. The composition of claim 8 wherein the weight ratio of calcium or barium to the other metal is about 0.1:1 to about 15:1.

24. The composition of claim 23 wherein the weight ratio is about 0.5:1 to about 4:1.

25. The composition of claim 1 wherein the liquid organic medium is an oil.

26. The composition of claim 25 wherein the oil comprises about 15 to about 40 weight percent of the composition.

27. The composition of claim 1 wherein the liquid medium is an organic solvent.

28. The composition of claim 27 wherein the organic solvent is based on aromatic or aliphatic hydrocarbons.

29. The composition of claim 27 wherein the liquid organic medium is mineral spirits.

30. A process for providing shelf-stability to a mixture, in an organic fluid medium, of (a) a salt of a metal and a carboxylic acid having at least 6 carbon atoms and (b) a salt of a metal other than the metal of (a) and at least one carboxylic acid having at least 6 carbon atoms, comprising including in the mixture an oxime complexing agent.

31. The process of claim 30 wherein the complexing agent is an aldoxime or a ketoxime.

32. The process of claim 30 wherein the oxime is a dialkyl ketoxime.

33. The process of claim 32 wherein the ketoxime is methyl ethyl ketoxime.

34. The process of claim 30 wherein the complexing agent comprises about 0.01 to about 10% by weight of the composition.

35. The process of claim 30 wherein the complexing agent comprises about 1 to about 3% by weight of the composition.

36. The process of claim 30 wherein one of the metals is an alkaline earth metal.

37. The process of claim 36 wherein one of the metals is calcium or barium.

38. The process of claim 37 wherein the other metal is barium, cadmium, or zinc.

39. The process of claim 30 wherein two or three metals are present.

40. The process of claim 39 wherein at least three metals are present and the metals comprise barium, zinc, and cadmium or barium, zinc, and calcium.

41. The process of claim 30 wherein component (a) comprises a metal salt of a carboxylic acid having at least about 8 carbon atoms.

42. The process of claim 41 wherein component (a) comprises a metal salt of a carboxylic acid having about 14 to about 22 carbon atoms.

43. The process of claim 42 wherein the carboxylic acid of (a) has about 16 to about 20 carbon atoms.

44. The process of claim 43 wherein the carboxylic acid of (a) is oleic acid.

45. The process of claim 30 wherein component (b) comprises a metal salt of a carboxylic acid having at least about 8 carbon atoms.

46. The process of claim 45 wherein component (b) comprises a metal salt of a carboxylic acid having about 8 to about 18 carbon atoms.

47. The process of claim 46 wherein the carboxylic acid of (b) is octanoic acid.

48. The process of claim 30 wherein (a) is calcium oleate and (b) is zinc octoate.

49. The process of claim 30 wherein at least one of the salts is an overbased salt.

50. The process of claim 49 wherein the overbased salt is a carbonated material.

51. The process of claim 50 wherein the metal ratio of the overbased salt is about 2 to about 8.

52. The process of claim 37 wherein the weight ratio of calcium or barium to the other metal is about 0.1:1 to about 15:1.

53. The process of claim 52 wherein the weight ratio is about 0.5:1 to about 4:1.

54. The process of claim 30 wherein the liquid organic medium is an oil.

55. The process of claim 54 wherein the oil comprises about 15 to about 40 weight percent of the composition.

56. The process of claim 30 wherein the liquid medium is an organic solvent.

57. The process of claim 56 wherein the organic solvent is based on aromatic or aliphatic hydrocarbons.

58. The process of claim 56 wherein the liquid organic medium is mineral spirits.

59. A polymeric composition comprising a chlorine-containing polymer and the stabilized composition of claim 1.

60. The polymeric composition of claim 59 wherein the chlorine-containing polymer is polyvinyl chloride.

61. The polymeric composition of claim 59 wherein the amount of the stabilized composition is about 1 to about 10 parts by weight per hundred parts chlorine-containing polymer.

62. A stabilized composition consisting essentially of:
(a) a salt of a metal and a carboxylic acid having at least 6 carbon atoms;
(b) at least one salt of a metal other than the metal of (a) and a carboxylic acid having at least 6 carbon atoms; and
(c) an oxime complexing agent.

* * * * *